D. COZZOLINO.
EVAPORATING APPARATUS.
APPLICATION FILED JULY 11, 1912.

1,069,394.

Patented Aug. 5, 1913.

WITNESSES
H. J. Walker

INVENTOR
Donato Cozzolino
BY
ATTORNEYS

UNITED STATES PATENT OFFICE.

DONATO COZZOLINO, OF SAN DIEGO, CALIFORNIA.

EVAPORATING APPARATUS.

1,069,394.  Specification of Letters Patent.  Patented Aug. 5, 1913.

Application filed July 11, 1912. Serial No. 708,832.

*To all whom it may concern:*

Be it known that I, DONATO COZZOLINO, a subject of the King of Italy, and a resident of San Diego, in the county of San Diego and State of California, have invented a new and Improved Evaporating Apparatus, of which the following is a full, clear, and exact description.

The invention relates to apparatus for dealcoholizing, condensing, evaporating or distilling liquids that foam during ebullition, and its object is to provide a new and improved evaporating apparatus arranged to reduce foaming of the liquid to a minimum while undergoing ebullition and thus preventing the liquid from passing out of the apparatus. For the purpose mentioned use is made of an evaporating vessel provided with a perforate diaphragm arranged a short distance above the level of the liquid in the vessel so that in case the liquid begins to foam the foam can not pass through the diaphragm and be drawn out of the evaporating vessel.

A practical embodiment of the invention is represented in the accompanying drawings forming a part of this specification, in which similar characters of reference indicate corresponding parts in all the views.

Figure 1:
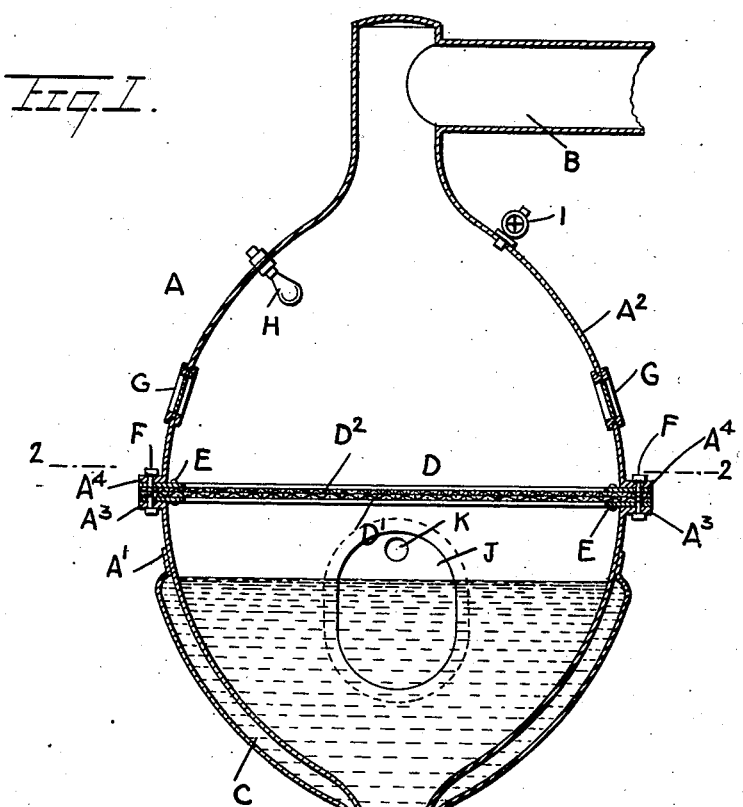
Figure 3:
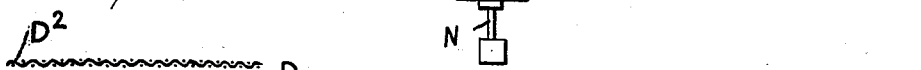
Figure 2:
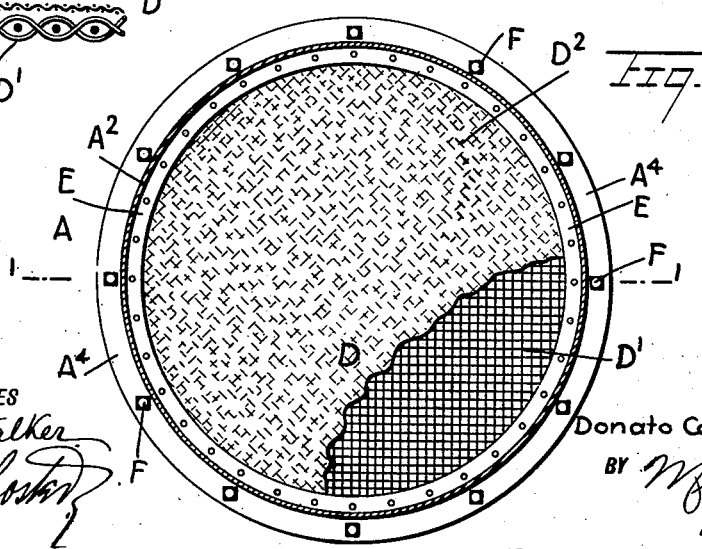

Figure 1 is a sectional side elevation of the evaporating apparatus on the line 1—1 of Fig. 2; Fig. 2 is a sectional plan view of the same on the line 2—2 of Fig. 1, part of the fabric top of the diaphragm being broken out; and Fig. 3 is an enlarged sectional side elevation of a portion of the diaphragm.

In order to check the foaming tendency of a liquid while undergoing ebullition in an evaporating apparatus, use has heretofore been made of soap, wax, oil, butter and other substances added to the liquid while undergoing ebullition, and it is well known that such added substances are only partially successful in liquids of weak foaming quality, and are practically without value in strongly foaming liquids, such as malt beverages, beer, ale, stout, and malt extracts, and fruit juices like pineapple juice, for instance. It is evident that the addition of such extraneous substances more or less taints and impairs the flavor thereof. With the improvement presently to be described in detail foaming is reduced to a minimum by mechanical means.

The evaporating vessel A shown in the drawings is preferably made of a lower section A' and an upper section $A^2$, of which the upper section $A^2$ is connected by a pipe B with a vacuum producing device, and the lower section A' contains the beer or other liquid undergoing treatment to be dealcoholized, condensed, evaporated or distilled. The liquid is heated either with a steam coil or with water contained in a water jacket C, as indicated in Fig. 1, or other suitable heating means may be employed. A diaphragm D is interposed between the sections A' and $A^2$ and is located a short distance above the liquid contained in the lower section A'. The diaphragm D is perforate and is preferably formed of a stout wire netting D' overlaid by one or more layers $D^2$ of burlap or other similar fabric material. The layers $D^2$ of the fabric material are clamped at their marginal edges between clamping rings E held between the flanges $A^3$ and $A^4$ of the sections A' and $A^2$, and which flanges are fastened together by bolts F which also pass through the clamping rings E.

When the apparatus is in use, the foam arising from the liquid does not pass through the diaphragm D and consequently is confined within the lower section A' of the vessel A. The diaphragm D is, however, sufficiently perforate to allow the vapors to pass through it and into the upper section $A^2$ from which the vapors are drawn through the pipe B to a refrigerating coil or other means to be depressed or condensed as the case may be.

In practice, it is advisable to produce a vacuum in the vessel A for a few minutes before heating the liquid contained in the lower section A' to allow the carbonic acid gas contained in the liquid to escape.

During the dealcoholizing, condensing, evaporating or distilling process the liquid is kept gently foaming and this is governed by the operator observing the operation within the vessel A through peep holes G arranged in the side walls of the upper section $A^2$. The upper section $A^2$ is provided with an electric light H for illuminating the interior thereof, and the upper section is also provided with a valve I to permit the admission of air to the upper section $A^2$ to reduce or break the vacuum therein to any desired degree in case the foaming should become excessive and the foam pass through the diaphragm D into the upper section $A^2$.

By keeping the temperature and the vacuum in proper relation, the process of dealcoholizing, condensing, evaporating or distilling proceeds regularly, and all the alcohol is separated in a few hours.

It is understood that in case the operator permits the liquid to filter through diaphragm D and to allow the liquid to foam in the upper section $A^2$, it is then only necessary to admit air by way of the valve I into the section $A^2$ to reduce the vacuum therein and thus stop foaming in the upper section $A^2$. It is also understood that without the diaphragm D the foam arising from the liquid is sucked up and pumped out of the vessel A by the vacuum pump or other vacuum producing device and consequently distillation is interfered with.

The evaporating vessel A is provided with a suitable manhole J having an inlet K for charging the vessel with liquid, and the lower end of the vessel A is provided with an outlet L controlled by a valve N for discharging the contents of the vessel after the process is completed.

Having thus described my invention, I claim as new and desire to secure by Letters Patent:

1. An evaporating apparatus, comprising an evaporating vessel made in sections, of which the lower section is adapted to contain the liquid to be evaporated and the upper section is provided with an outlet connected with a vacuum producing device, and a perforate diaphragm intermediate the said upper and lower sections, the diaphragm being formed of a layer of wire netting and superimposed layers of cloth fabric formed of textile material.

2. An evaporating apparatus comprising a vessel in two sections having flanged contiguous edges, of which the lower section is adapted to contain the liquid to be evaporated and the upper section is provided with an outlet connecting with a vacuum producing device, a perforated diaphragm intermediate the said upper and lower sections, said diaphragm being formed of a layer of wire netting constituting a foraminous support and a layer of cloth fabric formed of textile material disposed on said foraminous support and of sufficient weight to counterbalance the pressure of foam and at the same time admit of evaporation, the said diaphragm being clamped between the flanged vessel sections and thus held tightly in position.

In testimony whereof I have signed my name to this specification in the presence of two subscribing witnesses.

DONATO COZZOLINO.

Witnesses:
ALBERT VIGNOLO,
FLORENCIO FUZQUELLAS.